United States Patent Office 3,124,621
Patented Mar. 10, 1964

3,124,621
ISOMERIZATION OF CYCLOOCTADIENE COMPOUNDS
Donald L. Crain and Roger F. Kleinschmidt, Bartlesville, Okla., assignors to Phillips Petroleum Company, a corporation of Delaware
No Drawing. Filed June 19, 1961, Ser. No. 117,854
18 Claims. (Cl. 260—666)

This invention relates to the isomerization of cyclooctadiene compounds. In one aspect this invention relates to the isomerization of unconjugated cyclooctadiene compounds to conjugated cyclooctadiene compounds.

The various forms of the unconjugated cyclooctadiene compounds such as 1,4-cyclooctadiene, 1,5-cyclooctadiene, and alkylated derivatives thereof, are valuable starting materials for various syntheses. However, in many instances it is desirable to have the double bonds located in conjugated position, e.g., 1,3-cyclooctadiene. Thus, processes for isomerizing said unconjugated cyclooctadienes to corresponding conjugated cyclooctadienes are valuable tools for an organic chemist.

We have now discovered that unconjugated cyclooctadiene compounds can be isomerized to conjugated cyclooctadiene compounds by contacting said unconjugated cyclooctadiene compounds under isomerizing conditions with a catalyst selected from the group consisting of alkali metal amides and alkaline earth metal amides.

An object of this invention is to provide a process for isomerizing unconjugated cyclooctadiene compounds to conjugated cyclooctadiene compounds. Another object of this invention is to provide a process for isomerizing unconjugated cyclooctadienes such as 1,4-cyclooctadiene, 1,5-cyclooctadiene, and alkylated derivatives thereof to conjugated cyclooctadienes such as 1,3-cyclooctadiene. Other aspects, objects, and advantages of the invention will be apparent to those skilled in the art in view of this disclosure.

Thus, according to the invention there is provided a process for isomerizing an unconjugated cyclooctadiene to a conjugated cyclooctadiene containing the same number of carbon atoms and hydrogen atoms as said starting cyclooctadiene, which method comprises: contacting said unconjugated cyclooctadiene under isomerizing conditions with an isomerization catalyst selected from the group consisting of alkali metal amides and alkaline earth metal amides in the presence of a solvent selected from the group consisting of ammonia and suitable primary, secondary, and tertiary amines which is a solvent for both said unconjugated cyclooctadiene and said isomerization catalyst; and recovering said conjugated cyclooctadiene.

Suitable isomerization catalysts which can be employed in the practice of the invention are the alkali metal amides and the alkaline earth metal amides. As used herein and in the claims, unless otherwise specified, the term "alkali metals" refers to and includes sodium, potassium, lithium, rubidium, and cesium; and the term "alkaline earth metals" refers to and includes calcium, barium, and strontium.

Examples of isomerization catalysts which can be employed in the practice of the invention can be represented by the following structural formulas:

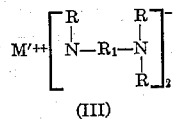
(I)

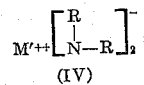
(II)

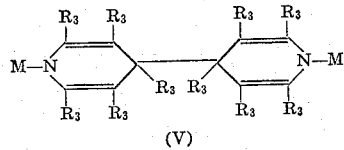
(III) and (IV)

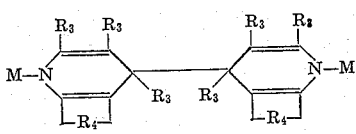
(V) and (VI)

wherein: M is an alkali metal selected from the group consisting of sodium, potassium, lithium, rubidium, and cesium; M' is an alkaline earth metal selected from the group consisting of calcium, strontium and barium; each R and each $R_3$ is selected from the group consisting of a hydrogen atom and alkyl radicals containing from 1 to 10 carbon atoms; each $R_1$ is selected from the group consisting of (a) alkylene radicals containing from 2 to 3 carbon atoms, (b) cycloalkylene radicals containing from 6 to 10 carbon atoms, and (c)

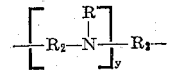

radicals wherein R is as defined above, each $R_2$ is an alkylene radical containing from 2 to 3 carbon atoms, y is an integer from 1 to 2, and wherein when $R_1$ is a cycloalkylene radical, only one amino nitrogen atom is attached to any one ring carbon atom; and $R_4$ is selected from the group of radicals consisting of

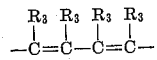

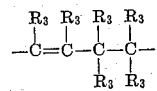

and

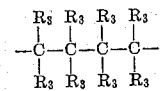

wherein each $R_3$ is as defined above.

Said isomerization catalysts employed in the practice of the invention can be prepared by any suitable method known to those skilled in the art. A number of said catalysts are commonly prepared by the direct reaction of the desired metal with ammonia or a suitable primary or secondary amine. For example, the monoamide of lithium and ethylenediamine can be prepared by contacting metallic lithium with ethylenediamine, at a temperature such as about 30–115° C., for a period of time sufficient to obtain reaction of said metal with said amine, generally 1 to 5 hours. One example of the preparation of said monoamide of lithium and ethylenediamine is given in Example I below. The monoamides of potassium, rubidium, and cesium can be prepared in a manner similar to that for said monoamide of lithium and ethylenediamine. The amides of sodium, calcium, strontium, and barium of Formula I or III and the alkyl substituted amides of Formula II or IV can be prepared by the reaction of the desired amine with the inorganic amides, i.e., sodium amide, calcium amide, strontium amide, and barium amide, all of which compounds are available commercially or can be readily prepared by known methods. Said amide catalysts can be prepared in situ in the reaction vessel or they can be prepared ahead of time, stored until needed (preferably under an atmosphere of nitrogen), and then dissolved in the amine solvent to be employed in the isomerization reaction when needed. Examples of the metal amides which fall within the scope of the above general Formulas I to IV are the lithium, potassium, sodium, rubidium, cesium, calcium, strontium and barium amides of the following amines, among others: ethane-1,2-diamine; propane-1,3-diamine; propane-1,2-diamine; cyclohexane-1,2-diamine; cyclohexane-1,4-diamine; 4-methylcyclohexane-1,2-diamine; 5,6-diethylcyclohexane-1,3-diamine; 3-n-butylcyclohexane-1,2-diamine; diethylenetriamine; dipropylenetriamine; triethylenetetraamine; methylamine; diethylamine; n-propylamine; di-n-butylamine; di-n-hexylamine; sec-octylamine; and di-n-decylamine.

The catalysts of Formulas V and VI can be prepared by contacting pyridines and quinolines with an alkali metal. This contacting can be conveniently carried out at elevated temperatures, e.g., 100° to 150° C. While in many instances the contacting can be satisfactorily carried out by merely contacting the alkali metal with the selected heterocyclic compound, one can use dispersions of the alkali metal in an inert solvent such as a hydrocarbon, heptane for example. If dispersions are used, the reactivity of the alkali metal is greater, and lower temperatures, even atmospheric temperature, e.g., 25° C., can be used during the contacting.

Some examples of compounds which can be reacted with alkali metals to form the catalysts of Formulas V and VI are pyridine; 2-methylpyridine; 2,4,6-trimethylpyridine; 2,3,4,5,6-pentaethylpyridine; 2-ethyl-5-n-butylpyridine; 2-methyl - 5 - ethylpyridine; 2-n-hexylpyridine; 2,3,4-tri-n-heptylpyridine; 4-tert-butylpyridine; 3-n-decylpyridine; 2,3,4,5,6-penta-n-decylpyridine; quinoline; 2,4,6-triethylquinoline; 2,3,4,5,6,7,8 - hepta-n-butylquinoline; 2,3,4-trimethyl-5,8-dihydroquinoline; 5-n-decyl - 5,6,7,8-tetrahydroquinoline; 5,5,6,6,7,7,8,8-octamethyl - 5,6,7,8-tetrahydroquinoline; 2,3,4,5,6,7,8-hepta-n-decylquinoline; and the like. The only restriction on the nitrogen-containing heterocyclic compound which must be considered is that such compounds should not contain substitutents which are reactive with alkali metals.

The monolithium amide of ethylenediamine is an example of an amide having the structure of the above Formula I. The monocalcium amide of ethylenediamine and the monocalcium amide of diethylene triamine are examples of metal amides having a structure like that of the above Formula III. Lithium amide and sodium amide are examples of metal amides having a structure like that of the above Formula II. Calcium amide is an example of a metal amide having a structure like that of the above Formula IV. N,N'-disodio-di(N,4-dihydropyridyl) and N,N'-disodio-di(N,4-dihydroquinolyl) are examples of metal amides in accordance with Formulas V and VI, respectively. The preferred amides for use in the practice of the invention are those of sodium and lithium, lithium amides being the most preferred.

In the practice of the invention said isomerization catalysts are usually employed in a mol ratio of catalyst to unconjugated cyclooctadiene being isomerized within the range of 0.05:1 to 20:1, preferably within the range of 0.1:1 to 10:1.

The isomerization reaction of the invention is preferably carried out under essentially anhydrous conditions. The presence of small amounts of water can be tolerated. However, the presence of water in the reaction zone decreases the efficiency of the reaction because water reacts with the metal from which the metal amide catalysts are prepared, and also will react with the metal amides after they have been prepared. Thus it is preferred that the amines and other materials be essentially anhydrous.

The isomerization reaction of the invention is carried out in the presence of an ammonia or an amine solvent or a mixture of said ammonia or amine solvent with another organic solvent. Said solvent or mixtures of solvents should be a solvent for both the isomerization catalyst and the unconjugated cyclooctadiene compound being isomerized. Preferred solvents for use in the practice of the invention are the amines mentioned herein. Said ammonia and primary and secondary amine solvents function as proton donors in the isomerization reaction and serve to cause said reaction to go farther toward completion. Thus, the amine solvent used in any particular isomerization reaction of the invention is preferably at least as basic as the amine from which the metal amide catalyst employed in said reaction was prepared. In other words, and generally speaking, if metal amide catalyst was prepared from a primary amine, then a primary amine solvent should be employed as the solvent media for carrying out the isomerization reaction. If the metal amide catalyst was prepared from a secondary amine, then either a secondary amine or a primary amine can be employed as the solvent media for carrying out the isomerization reaction. If the metal amide catalyst was prepared from a tertiary amine such as a pyridine or a quinoline, then either a primary amine, a secondary amine, or a tertiary amine can be employed as the solvent media for carrying out the isomerization reaction. Thus, any suitable primary, secondary, or tertiary amine can be employed in the practice of the invention. Generally speaking, the most preferred solvent in any situation is the amine from which the metal amide catalyst was prepared.

Included among the compounds which can be employed as solvents in the practice of the invention are anhydrous ammonia, heterocyclic amines such as piperidine, N-methylpiperidine and morpholine, dimethylaniline, and amines represented by the following formulas

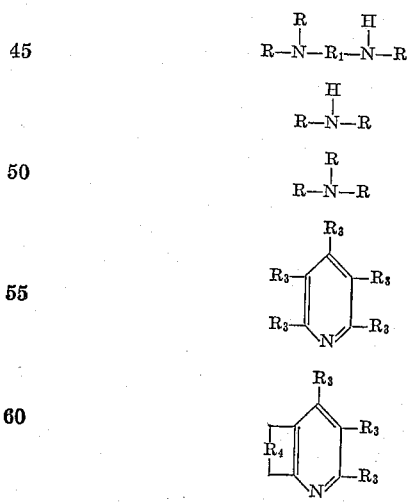

wherein each R, $R_1$, $R_3$, and $R_4$ are as defined above in connection with said metal amide catalysts.

Some examples of compounds of the above general amine formulas which can be employed as solvents in the practice of the invention are: ethylenediamine; N,N-dimethylethylenediamine; N,N,N' - trimethylethylenediamine; N,N'-di-n-pentylethylenediamine; N,N,N' - tri - n-heptylpropane-1,3-diamine; N,N'-di-n-decylpropane - 1,2-diamine; N-sec-butyldiethylenetriamine; N,N - dimethylcyclohexane-1,4-diamine; N,N,N'-triethylcyclohexane-1,3-diamine; methylamine; diethylamine; trimethylamine; triethylamine; tri-n-butylamine; tri-tert-butylamine; N- methyl-N-ethyloctylamine; tri-sec-octylamine; tri-n-decylamine; di-n-propylamine; n-hexylamine; di-sec-heptylamine; tert-octylamine; n-decylamine; and the like. It is to be understood that ammonia and the amines named above in connection with the preparation of the various metal amide catalysts also come within the scope of the above general solvent formulas and can be employed as solvents. It is also to be understood that ammonia and the other amines set forth above as solvents can also be used to prepare said metal amide catalysts.

The amount of said ammonia or amine solvent employed in the practice of the invention is an amount sufficient to give an ammonia or amine to unconjugated cyclooctadiene mol ratio within the range of about 1:1 to about 20:1, preferably 3:1 to 6:1.

In addition to said ammonia or amine solvent there can also be present in the reaction zone, as a part of the media in which the isomerization reaction is carried out, an additional organic solvent. Said additional organic solvent can be any solvent which is a solvent for the metal amide catalyst and the unconjugated cyclooctadiene compound being isomerized and which is chemically inert under the reaction conditions. Included among the suitable additional solvents are the saturated cyclic and acyclic ethers, including monoethers and polyethers, containing from 2 to 20 carbon atoms per molecule. Examples of suitable additional solvents which can be employed in the practice of the invention include, among others, the following: dicyclohexyl ether, diethyl ether of diethylene glycol, dibutyl ether of ethylene glycol, dimethyl ether of diethylene glycol, N-methylmorpholine, m-dioxane, p-dioxane, tetrahydrofuran, tetrahydropyran, and ethers characterized by the formula $R_1$—O—$R_1$ wherein each $R_1$ is an alkyl radical containing from 1 to 10 carbon atoms. Examples of ethers characterized by the above formula include, among others, the following: dimethyl ether; diethyl ether, di-n-butyl ether; diisopropyl ether; di-n-hexyl ether; and di-n-decyl ether.

When employed, said additional organic solvent is employed in an amount sufficient to give an organic solvent to ammonia or amine solvent volume ratio within the range of 3:1 to 10:1.

The isomerization reaction of the invention is generally carried out at a temperature within the range of 20 to 200° C., preferably 90 to 150° C. The reaction time will be governed by such factors as catalyst ratio, and temperature but will generally be in the range of 10 minutes to 24 hours, more generally in the range of 2 to 18 hours. The reaction is carried out under liquid phase conditions, in many instances at atmospheric pressure; however, superatmospheric pressures can be employed to maintain said liquid phase conditions if necessary.

Unconjugated cyclooctadienes which can be isomerized to conjugated cyclooctadienes in accordance with the invention include those having the following structural formulas:

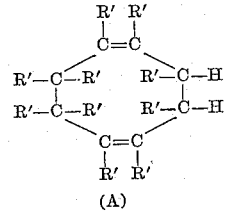
(A)

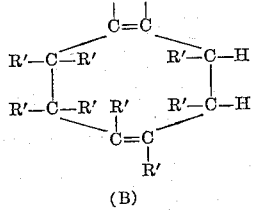
(B)

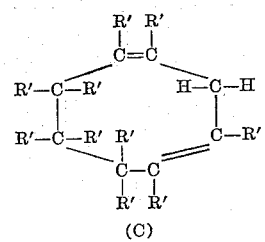
(C)

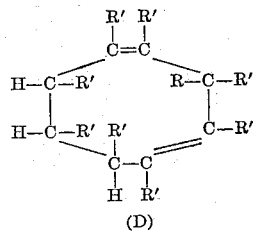
(D)

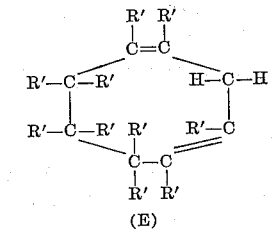
(E)

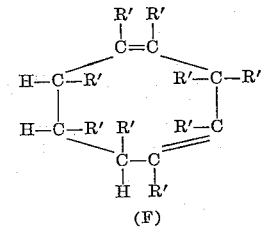
(F)

wherein each R' can be either a hydrogen atom or an alkyl group containing from 1 to 5 carbon atoms. It should be noted that in the above formulas there is at least one proton (hydrogen atom) attached to each of two adjacent allylic carbon atoms (carbon atoms adjacent the double bonds) or two protons on the same allylic carbon. Thus, the alkylated derivatives which can be isomerized in accordance with the invention are those which contain sufficient protons for double bond shifting to occur under isomerization conditions.

Examples of said unconjugated cyclooctadienes include, among others, the following:

Cis, cis-1,5-cyclooctadiene;
Cis, cis-3-methyl-1,5-cyclooctadiene;
Cis, cis-3,7-diethyl-1,5-cyclooctadiene;
Cis, cis-3,4,8-tri-n-propyl-1,5-cyclooctadiene;
Cis, cis-3,4,7,8-tetra-n-pentyl-1,5-cyclooctadiene;
Cis, cis-1,2,3,4,5,6,7,8-octamethyl-1,5-cyclooctadiene;
Cis, trans-1,5-cyclooctadiene;
Cis, trans-3-n-butyl-1,5-cyclooctadiene;
Cis, trans-4,8-di-n-pentyl-1,5-cyclooctadiene;
Cis, trans-3,4-dimethyl-1,5-cyclooctadiene;
Cis, trans-1,2,5,6-tetraisopropyl-1,5-cyclooctadiene;
Cis, trans-8-tert-butyl-1,5-cyclooctadiene;
Cis, trans-1,2,3,4,5,6,7,8,8-deca-n-pentyl-1,5-cyclooctadiene;
Cis, trans-1,2-diethyl-1,5-cyclooctadiene;
Cis, cis-1,2-dimethyl-1,4-cyloooctadiene;
Cis, cis-3-ethyl-1,4-cyclooctadiene;
Cis. cis-3,8,8-tri-n-propyl-1,4-cyclooctadiene;
Cis. cis-1,2,4,5,6,6,7,7,8,8-decamethyl-1,4-cyclooctadiene;
Cis, cis-1,4-cyclooctadiene;
Cis, cis-1,2,3,3-tetra-n-butyl-1,4-cyclooctadiene;
Cis, cis-1,2,4,5-tetra-n-pentyl-1,4-cyclooctadiene;

Cis, cis-1,2,3,3,4,5,6,7,8-nona-n-propyl-1,4-cyclooctadiene;
Cis, trans-1,2,7,7-tetramethyl-1,4-cyclooctadiene;
Cis, trans-6,6,7,7,8,8-hexa-n-butyl-1,4-cyclooctadiene;
Cis, trans-1,2,3,4-tetra-n-pentyl-1,4-cyclooctadiene;
Cis, trans-1,2,4,5,6,6,8-heptaethyl-1,4-cyclooctadiene;
Cis, trans-8-tert-butyl-1-,4-cyclooctadiene;
Cis, trans-3,3-di-sec-pentyl-1,4-cyclooctadiene;
Cis, trans-3,3,7,8-tetraethyl-1,4-cyclooctadiene;
Cis, trans-1,2,3,3,4,5,6,7,8-nona-n-propyl-1,4-cyclooctadiene;
Cis, trans-1,4-cyclooctadiene; and the like.

Since the cis, cis-form of the conjugated 1,3-cyclooctadienes is the most stable form, the product obtained is a cis, cis-1,3-cyclooctadiene even though some of the cis, trans-isomer may be formed as an intermediate product. Cis, cis-1,3-cyclooctadiene has the following formula

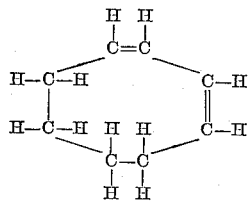

In one presently preferred method for carrying out the isomerization reaction of the invention, the metal amide isomerization catalyst is prepared in situ. For example, ethylenediamine is purified by refluxing with sodium metal, followed by fractional distillation from the sodium to give an anhydrous amine. A metal such as lithium is cut into small pieces, added to said purified ethylenediamine, and the mixture refluxed for a period of time sufficient to insure complete reaction of all the metal. To the solution of the metal amide catalyst thus prepared there is then added, slowly, the unconjugated cyclooctadiene compound to be isomerized. The resulting mixture is then maintained at the desired temperature, with stirring, for the desired reaction time. The isoomerizate, comprising the corresponding conjugated cyclooctadiene, is then recovered from the resulting reaction mixture.

In another method, the metal amide isomerization catalyst is formed in situ in the presence of an ether solvent. In this method, the ether, e.g., anhydrous n-butyl ether; the metal, e.g., lithium; and the amine, e.g., anhydrous ethylenediamine, are charged to a reaction vessel and refluxed at a suitable temperature for a suitable length of time to insure complete reaction of said metal with said amine. The unconjugated cyclooctadiene compound to be isomerized is then charged to said reaction vessel, the reaction is carried out as described above, and the resulting conjugated cyclooctadiene recovered from the resulting reaction mixture.

In still another method, which is advantageously employed when the metal amide catalyst is prepared by the reaction of the metal amide with the amine, a slurry of the metal amide, e.g., sodium amide, in a dry low boiling hydrocarbon, e.g., normal pentane, is added to a reaction vessel and a suitable amount of anhydrous amine, e.g., ethylenediamine, is slowly added to said slurry with stirring. The resulting mixture is then stirred at a suitable temperature for a suitable period of time to insure formation of the catalyst. The unconjugated cyclooctadiene to be isomerized is then slowly added to the thus formed solution of catalyst, the reaction carried out as above described, and the resulting conjugated cyclooctadiene recovered from the reaction mixture.

The following examples will serve to further illustrate the invention.

*Example I*

One hundred ml. of ethylenediamine which had been disilled from sodium was charged to a 500 ml., 3-necked flask equipped with a stirrer, condenser, thermometer, and dropping funnel. To this amine was then added 4.5 grams (0.649 mol) of metallic lithium. The lithium was charged by adding small portions of the metal, which had been cut from a tape, to the amine at 95–98° C. while stirring.

After all of the lithium had reacted with the amine, 69.9 grams (0.592 mol) of cis, cis-1,5-cyclooctadiene was charged to the flask over about a 5 minute period. The diene was charged to the stirred reaction mixture while maintaining the mixture at 98° C. The resulting solution was then stirred at 97–98° C. for 30 minutes. The resulting deep red solution was then cooled to 30° C. and hydrolyzed by addition of 100 cc. of water. The aqueous mixture was then poured into 100 ml. water, and the resulting mixture was then extracted several times with n-pentane. The combined pentane extracts were then washed with water and extracted with 3 N hydrochloric acid.

The resulting amine-free solution was then washed with water and dried over anhydrous sodium sulfate. The pentane was then distilled off, and the remaining "oil" was fractionated at reduced pressure. The fractionation details are as follows:

| Cut No. | B.P. (°C.) | Pot Temp. °C. | Press., mm. | Grams | $n_D^{20}$ |
|---|---|---|---|---|---|
| 1 | 61–63 | 67 | 74 | 1.6 | 1.4828 |
| 2 | 63–64 | 67 | 74 | 12.6 | 1.4927 |
| 3 | 64 | 67–72 | 74 | 24.2 | 1.4934 |
| 4 | 64 | 72–130 | 74 | 6.2 | 1.4934 |
| 5 | 64+ | 130–140 | 20–74 | 3.7 | 1.4934 |
| Pot Residue | | | | 2.1 | |
| Total | | | | 50.4 | |

A gas chromatogram of cut No. 3 showed the presence of only one component, and the retention time of this material was 7 minutes less than the starting material.

A 0.1796 gram sample cut No. 3 was hydrogenated in a micro-hydrogenation apparatus at 744 mm. and 20° C. using glacial acetic acid as the solvent and prereduced platinum oxide as the catalyst. The amount of hydrogen absorbed at these conditions was 86.8 ml. which is equivalent to 2.01 double bonds based on the molecular weight of the starting material, cis, cis-1,5-cyclooctadiene. Upon completion of the hydrogenation the catalyst was removed by filtration, the solution was poured into water, and extracted with n-pentane. The pentane extract was washed with aqueous NaOH and the material was then evaporated to a small volume. Gas chromatographic analysis of this material showed the presence of n-pentane and one other component which had a retention time of 58.8 minutes.

A 0.1881 gram sample of cis, cis-1,5-cyclooctadiene was hydrogenated in the same manner as above. The amount of hydrogen absorbed was equivalent to 1.94 double bonds. The reduced sample was worked up in the same manner as above and subjected to analysis by gas chromatography. The one component present, other than pentane, had a retention time of 58.6 minutes, indicating that the compounds from the two reductions were the same, and that the product from the contacting of cis, cis-1,5-cyclooctadiene with the lithium-ethylenediamine catalyst was still a cyclooctadiene.

The refractive index $n_D^{20}=1.4934$ of cut 3 was in good agreement with the values of $n_D^{25}=1.4908$ and $n_D^{25}=1.4940$ given for cis, cis-1,3-cyclooctadiene by Cope et al., J. Am. Chem. Soc., 72 1131 (1950). Furthermore the infrared spectrum for cut 3 was identical with the infrared spectrum of cis, cis-1,3-cyclooctadiene given by Cope et al.

It is apparent that the isomerization of cis, cis-1,5-cyclooctadiene to cis, cis-1,3-cyclooctadiene was effected by contact with the lithium amide of ethylene diamine.

Example II

In another run, the isomerization of cis, cis-1,5-cyclooctadiene to cis, cis-1,3-cyclooctadiene was effected employing N,N'-disodio-di(N,4-dihydropyridyl) as the catalyst.

In this run a mixture of 2.3 grams (0.1 mol) of sodium and 50 ml. of anhydrous pyridine was stirred at reflux under a nitrogen atmosphere for 45 minutes. To this dark-colored solution was then rapidly added, while refluxing and stirring, 13.7 grams (0.127 mol) of cis, cis-1,5-cyclooctadiene. At periodic intervals, 1 cc. samples of the reaction mixture were withdrawn, hydrolyzed in water and extracted in pentane. The extracts were washed with 10% HCl, and the n-pentane was evaporated off. The residual "oil" from each sample was then analyzed by gas chromatography. The chromatogram contained only two peaks whose retention times were identical with cis, cis-1,5-cyclooctadiene (starting material) and cis, cis-1,3-cyclooctadiene. The following table is a tabulation of the analyses of these samples.

| Time after Charging Cyclooctadiene, Hrs | Sample Analysis | |
|---|---|---|
| | Wt. percent cis, cis-1,5-cyclooctadiene | Wt. percent cis, cis-1,3-cyclooctadiene |
| 0.5 | 94.4 | 5.6 |
| 1.5 | 82.6 | 17.4 |
| 4.0 | 48.8 | 51.2 |
| 6.0 | 35.4 | 64.6 |
| 7.0 | 29.4 | 70.6 |

The reaction mixture was allowed to stand overnight at room temperature under nitrogen. The mixture was then cooled in an ice bath and hydrolyzed with water. No hydrogen or other gases were evolved upon hydrolysis, hence all of the sodium had reacted with the pyridine. The reaction mixture was extracted with pentane, and the extract was washed with 10% HCl and then with water. The solvent was then evaporated off, and the remaining residual "oil" was fractionated at 74 mm. A total of 6.1 grams of clear distillate boiling 65–66° C. @ 74 mm. was obtained. Gas chromatography showed this material to consist of 26.7% cis, cis-1,5-cyclooctadiene and 73.7% cis, cis-1,3-cyclooctadiene.

The products of the process of the invention have utility as chemical intermediates. Thus, cis, cis-1,3-cyclooctadiene is useful in the preparation of cyclooctatetraene, cyclooctane, and cyclooctene, as well as in the preparation of polymers.

Although the isomerization process has been described as a batch operation, it will be apparent to those skilled in the art that a continuous system can be employed without deviating from the inventive concept disclosed herein.

While certain embodiments of the invention have been described for illustrative purposes, the invention obviously is not limited thereto. Various other modifications will be apparent to those skilled in the art in view of the above disclosure. Such modifications are within the spirit and scope of the invention.

We claim:

1. A process for isomerizing an unconjugated cyclooctadiene to a conjugated cyclooctadiene containing the same number of carbon atoms and hydrogen atoms as said starting cyclooctadiene, which method comprises: contacting said unconjugated cyclooctadiene under isomerizing conditions with an isomerization catalyst selected from the group consisting of alkali metal amides and alkaline earth metal amides in the presence of a solvent selected from the group consisting of ammonia and suitable primary, secondary, and tertiary amines which is a solvent for both said unconjugated cyclooctadiene and said isomerization catalyst; and recovering said conjugated cyclooctadiene.

2. A process for isomerizing an unconjugated cyclooctadiene selected from the group consisting of cis, cis-1,5-cyclooctadiene, cis, trans-1,5-cyclooctadiene, cis, cis-1,4-cyclooctadiene, cis, trans-1,4-cyclooctadiene, alkyl derivatives of said cyclooctadienes, and mixtures thereof to a corresponding cis, cis-1,3-cyclooctadiene which process comprises: contacting said unconjugated cyclooctadiene under isomerizing conditions with an isomerization catalyst selected from the group consisting of alkali metal amides and alkaline earth metal amides in the presence of a solvent selected from the group consisting of ammonia and suitable primary, secondary, and tertiary amines which is a solvent for both said unconjugated cyclooctadiene and said isomerization catalyst; and recovering said cis, cis-1,3-cyclooctadiene.

3. The process of claim 2 wherein said unconjugated cyclooctadiene is cis, cis-1,5-cyclooctadiene.

4. The process of claim 2 wherein said unconjugated cyclooctadiene is cis, trans-1,5-cyclooctadiene.

5. The process of claim 2 wherein said unconjugated cyclooctadiene is cis, cis-1,4-cyclooctadiene.

6. The process of claim 2 wherein said unconjugated cyclooctadiene is cis, trans-1,4-cyclooctadiene.

7. The process of claim 2 wherein: said unconjugated cyclooctadiene is contacted with said isomerization catalyst at a temperature within the range of 20 to 200° C. for a period of time within the range of 10 minutes to 24 hours; said isomerization catalyst is present in an amount sufficient to give a catalyst to starting diene mol ratio within the range of 0.05:1 to 20:1; and said solvent is present in a mol ratio of solvent to said unconjugated cyclooctadiene within the range of about 1:1 to about 20:1.

8. The process of claim 3 wherein said cis, cis-1,5-cyclooctadiene is contacted with said isomerization catalyst at a temperature within the range of 20 to 200° C., for a period of time within the range of 10 minutes to 24 hours; said isomerization catalyst is present in an amount sufficient to give a catalyst to starting diene mol ratio within the range of 0.05:1 to 20:1; and said solvent is present in a mol ratio of solvent to said starting diene within the range of about 1:1 to about 20:1.

9. A process for isomerizing an unconjugated cyclooctadiene selected from the group consisting of cis, cis-1,5-cyclooctadiene, cis, trans-1,5-cyclooctadiene, cis, cis-1,4-cyclooctadiene, cis, trans-1,4-cyclooctadiene, alkyl derivatives of said cyclooctadienes, and mixtures thereof to a corresponding cis, cis-1,3-cyclooctadiene which process comprises: contacting said unconjugated cyclooctadiene under isomerizing conditions with an isomerization catalyst selected from the group consisting of alkali metal amides and alkaline earth metal amides in the presence of a first organic solvent which is a solvent for both said unconjugated cyclooctadiene and said catalyst and which is chemically inert under the reaction conditions, and also in the presence of a second solvent selected from the group consisting of ammonia and suitable primary, secondary, and tertiary amines which is also a solvent for both said unconjugated cyclooctadiene and said isomerization catalyst; and recovering said cis, cis-1,3-cyclooctadiene.

10. A process for isomerizing an unconjugated cyclooctadiene selected from the group consisting of cis, cis-1,5-cyclooctadiene, cis, trans-1,5-cyclooctadiene, cis, cis-1,4-cyclooctadiene, cis, trans-1,4-cyclooctadiene, alkyl derivatives of said cyclooctadienes, and mixtures thereof to a corresponding cis, cis-1,3-cyclooctadiene which process comprises: contacting said unconjugated cyclooctadiene under isomerizing conditions with an isomerization catalyst selected from the group consisting of alkali metal amides and alkaline earth metal amides in the presence of an ether solvent selected from the group consisting of saturated cyclic and acyclic ethers containing from 2 to 20 carbon atoms per molecule and which is a solvent for both said unconjugated cyclooctadiene and said catalyst, and also in the presence of a second solvent selected from the group consisting of ammonia and suitable primary, secondary, and tertiary amines which is also a solvent for both said unconjugated cyclooctadiene and said isomerization catalyst; and recovering said cis, cis-1,3-cyclooctadiene.

11. A process for isomerizing an unconjugated cyclooctadiene hydrocarbon to a conjugated cyclooctadiene hydrocarbon, which process comprises contacting said unconjugated cyclooctadiene hydrocarbon at a temperature within the range of 20 to 200° C., for a period of time within the range of 10 minutes to 24 hours, with an isomerization catalyst present in an amount sufficient to give a catalyst to unconjugated cyclooctadiene mol ratio within the range of 0.05:1 to 20:1, in the presence of an essentially anhydrous solvent which is a solvent for both said catalyst and said unconjugated cyclooctadiene and which is present in a mol ratio of solvent to said unconjugated cyclooctadiene within the range of about 1:1 to about 20:1, and recovering said conjugated cyclooctadiene hydrocarbon from the resulting reaction mixture; said isomerization catalyst being selected from the group consisting of alkali metal and alkaline earth metal amides characterized by the following structural formulas

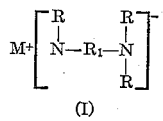

(I)

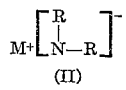

(II)

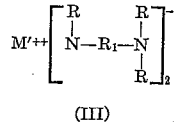

(III)

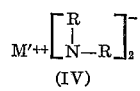

(IV)

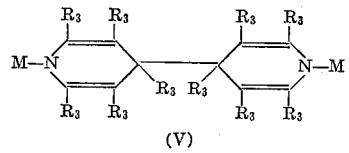

(V)

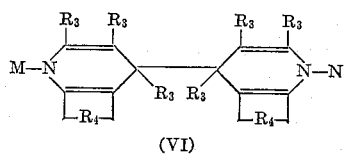

(VI)

wherein: M is an alkali metal selected from the group consisting of sodium, potassium, lithium, rubidium, and cesium; M' is an alkaline earth metal selected from the group consisting of calcium, strontium, and barium; each R and each $R_3$ is selected from the group consisting of a hydrogen atom and alkyl radicals containing from 1 to 10 carbon atoms; each $R_1$ is selected from the group consisting of (a) alkylene radicals containing from 2 to 3 carbon atoms, (b) cycloalkylene radicals containing from 6 to 10 carbon atoms, and (c)

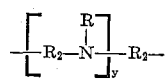

radicals wherein R is as defined above, each $R_2$ is an alkylene radical containing from 2 to 3 carbon atoms, $y$ is an integer of from 1 to 2, and wherein when $R_1$ is a cycloalkylene radical, only one amino nitrogen atom is attached to any one ring carbon atom; and $R_4$ is selected from the group of radicals consisting of

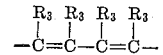

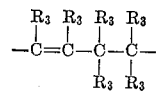

and

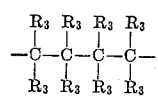

wherein each $R_3$ is as defined above; and recovering said conjugated cyclooctadiene hydrocarbon.

12. The process of claim 11 wherein said isomerization catalyst is the monoamide of lithium and ethylene diamine and said solvent is ethylenediamine.

13. The process of claim 11 wherein said isomerization catalyst is N,N'-disodio-di(N,4-dihydropyridyl) and said solvent is pyridine.

14. A process for isomerizing an unconjugated cyclooctadiene hydrocarbon selected from the group consisting of cis, cis-1,5-cyclooctadiene, cis, trans-1,5-cyclooctadiene, cis, cis-1,4-cyclooctadiene, cis, trans-1,4-cyclooctadiene, alkyl derivatives of said cyclooctadienes, and mixtures thereof, to a conjugated cyclooctadiene hydrocarbon, which process comprises: contacting said unconjugated cyclooctadiene hydrocarbon at a temperature within the range of 20 to 200° C., for a period of time within the range of 10 minutes to 24 hours, with an isomerization catalyst present in an amount sufficient to give a catalyst to unconjugated cyclooctadiene mol ratio within the range of 0.05:1 to 20:1, in the presence of an essentially anhydrous first solvent which is a solvent for both said catalyst and said unconjugated cyclooctadiene and which is present in a mol ratio of said first solvent to said unconjugated cyclooctadiene within the range of about 1:1 to about 20:1, and also in the presence of an essentially anhydrous second solvent which is also a solvent for both said catalyst and said unconjugated cyclooctadiene and which is present in an amount sufficient to give a second solvent to first solvent volume ratio within the range of 3:1 to 10:1; and recovering said conjugated cyclooctadiene hydrocarbon from the resulting reaction mixture; said isomerization catalyst being selected from the group consisting of alkali metal and alkaline earth metal amides characterized by the structural Formulas I to VI inclusive as defined in claim 11; said first solvent being selected from the group consisting of ammonia, piperidine, morpholine, and amines characterized by the following formulas

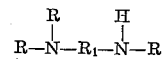

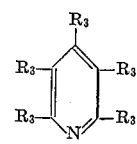

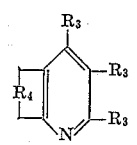

wherein each R, $R_1$, $R_3$, and $R_4$ are as defined in claim 11 in connection with said Formulas I–VI; and said second solvent being selected from the group consisting of saturated cyclic and acyclic ethers containing from 2 to 20 carbon atoms per molecule; and recovering said conjugated cyclooctadiene hydrocarbon.

15. The process of claim 14 wherein said unconjugated cyclooctadiene is cis, cis-1,5-cyclooctadiene, said catalyst is the monamide of lithium and ethylene diamine, and said first solvent is ethylenediamine.

16. The process of claim 14 wherein said unconjugated cyclooctadiene is cis, cis-1,5-cyclooctadiene, said catalyst is N,N'-disodio-di(N,4-dihydropyridyl) and said first solvent is pyridine.

17. A process for the preparation of cis, cis-1,3-cyclooctadiene, which process comprises: forming a solution of monolithium amide isomerization catalyst by reacting lithium metal with an excess of essentially anhydrous ethylenediamine; adding cis, cis-1,5-cyclooctadiene to said solution in an amount sufficient to give a catalyst to cis, cis-1,5-cyclooctadiene mol ratio within the range of about 0.1:1 to about 10:1 and a mol ratio of ethylenediamine to said cis, cis-1,5-cyclooctadiene within the range of about 1:1 to about 20:1, contacting said cis, cis-1,5-cyclooctadiene with said catalyst solution at a temperature within the range of about 90 to about 150° C. for a period of time within the range of about 10 minutes to about 24 hours; and recovering said cis, cis-1,3-cyclooctadiene from the resulting reaction mixture.

18. A process for the preparation of cis, cis-1,3-cyclooctadiene, which process comprises: forming a solution of N,N'-disodio-4,4'-dipyridyl isomerization catalyst by reacting sodium metal with an excess of essentially anhydrous pyridine; adding cis, cis-1,5-cyclooctadiene to said solution in an amount sufficient to give a catalyst to cis, cis-1,5-cyclooctadiene mol ratio within the range of about 0.1:1 to 10:1 and a mol ratio of pyridine to said cis, cis-1,5-cyclooctadiene within the range of about 1:1 to about 20:1; contacting said cis, cis-1,5-cyclooctadiene with said catalyst in the resulting solution at a temperature within the range of about 90 to about 150° C. for a period of time within the range of about 10 to about 24 hours; and recovering said cis, cis-1,3-cyclooctadiene from the resulting reaction mixture.

No references cited.

UNITED STATES PATENT OFFICE
CERTIFICATE OF CORRECTION

Patent No. 3,124,621            March 10, 1964

Donald L. Crain et al.

It is hereby certified that error appears in the above numbered patent requiring correction and that the said Letters Patent should read as corrected below.

Column 11, lines 50 to 55, the formula should appear as shown below instead of as in the patent:

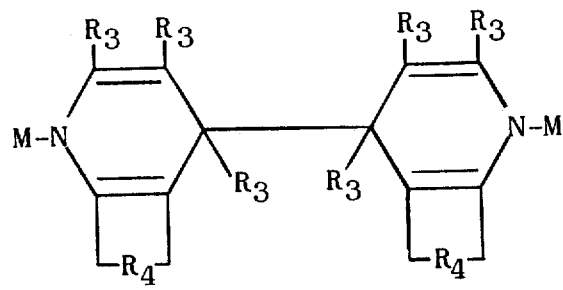

Signed and sealed this 28th day of July 1964.

(SEAL)
Attest:

ESTON G. JOHNSON
Attesting Officer

EDWARD J. BRENNER
Commissioner of Patents